Figure 1:
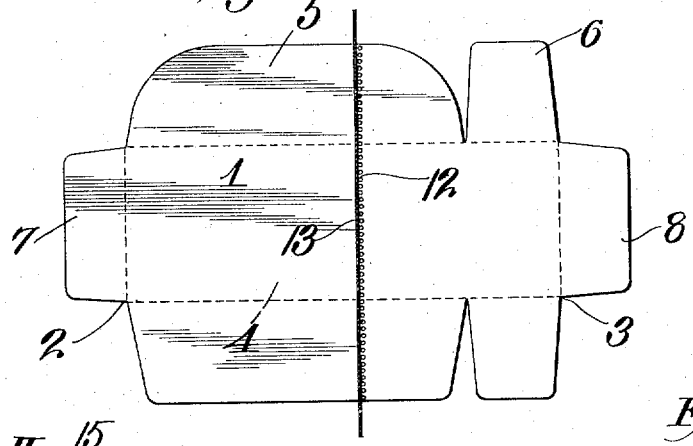
Figure 1:
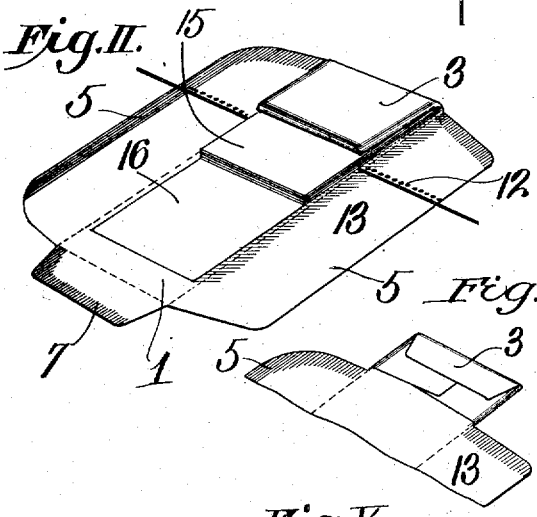
Figure 1:
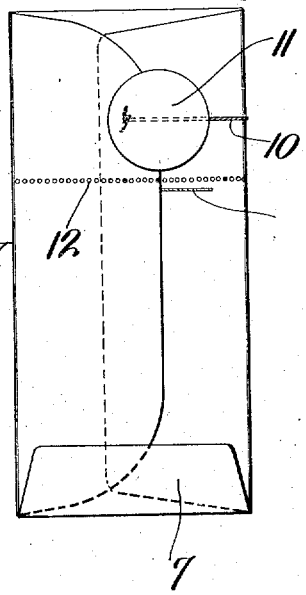
Figure 1:
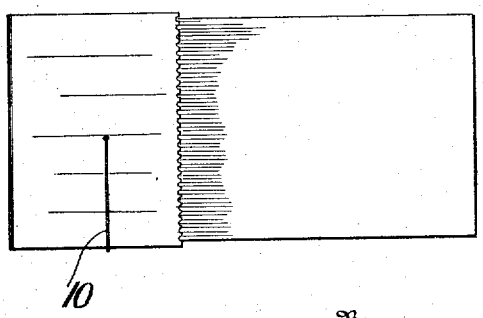

W. P. FAULKNER.

MONEY TRANSMITTING ENVELOP.

APPLICATION FILED AUG. 11, 1915.

Reissued Aug. 1, 1916. 14,175.

Fig. II.

Fig. III.

Fig. IV

Fig. V.

Inventor

William P. Faulkner

By Arthur C. Brown

Attorney

THE NORRIS PETERS CO., PHOTO-LITHO., WASHINGTON, D. C.

UNITED STATES PATENT OFFICE.

WILLIAM P. FAULKNER, OF KANSAS CITY, MISSOURI, ASSIGNOR TO JOHN R. SUTTER, OF KANSAS CITY, MISSOURI.

MONEY-TRANSMITTING ENVELOP.

14,175. Specification of Reissued Letters Patent. Reissued Aug. 1, 1916.

Original No. 1,136,948, dated April 27, 1915, Serial No. 850,162. Application for reissue filed August 11, 1915. Serial No. 45,068.

*To all whom it may concern:*

Be it known that I, WILLIAM P. FAULKNER, a citizen of the United States, residing at Kansas City, in the county of Jackson and State of Missouri, have invented certain new and useful Improvements in Money-Transmitting Envelops; and I do declare the following to be a full, clear, and exact description of the invention, such as will enable others skilled in the art to which it appertains to make and use the same, reference being had to the accompanying drawings, and to the letters and figures of reference thereon, which form a part of this specification.

My invention relates to money transmitting envelops, and more particularly to that class of envelops used by banks, express companies, railroads and others for transmitting currency, checks, securities, etc., and wherein such contents is stitched to the body of the envelop and sealed to prevent the removal of all or part of the contents during transmission or at either end of its travel.

I am aware that there are at the present time a number of envelops of this character in use, but none with which I am familiar is adapted for affording inspection of its contents without destroying the envelop and its seal in order that a consignee may inspect and verify the contents of the envelop, and I have in the present invention sought to provide for inspection and verification of such contents prior to the breaking of its seal, so that should there be a discrepancy in such contents the envelop and its contents may be returned to the sender with the seal intact.

In accomplishing the above object I have provided improved details of structure, the preferred form of which is illustrated in the accompanying drawings, wherein:—

Figure I is a plan view of an envelop blank constructed according to my invention. Fig. II is a perspective view of an envelop blank showing the body portion and sealing pocket, illustrating the line of severance and showing the pocket and its contents in position for the body portion to be sealed thereover. Fig. III is a plan view of the envelop in forwarding condition, illustrating the stitching and seal. Fig. IV is a detail view of a part of the envelop showing the formed sealing pocket. Fig. V is a plan view of the sealing pocket and envelop contents after the pocket has been severed from the body of the envelop and separated therefrom.

Referring more in detail to the drawings: 1 designates the envelop blank, comprising the integral body and pocket members 2—3, having the continuous back 4 and individual side flaps 5—6 and end flaps 7—8; the relative widths of the back 4 and side flaps 5—6 being such that when the flaps are folded over onto the back 4 they will overlap to form the envelop or closure presently described.

The adjacent edges of the side flaps 5—6 of the body and pocket members 2—3 diverge from the edge of the back 4 to facilitate folding of the back on a transverse line dividing the body and pocket members, and the outer edges of said flaps slant inwardly to facilitate the folding of the end flaps 7—8 thereover; the arrangement and construction being such that when the body and pocket flaps are folded to close the envelop, two separate envelops, having a common back 4 and facing openings, are provided, and that because of the construction heretofore described the pocket member may be folded along its line of division from the body member to lie over the body member and thereby close the ends of the body envelop and pocket.

While the pocket member 3 is preferably formed at the factory, by folding the flaps onto each other, it is not intended that the envelop shall be formed prior to its actual use, as part of the invention lies in the folding of the flaps by the person placing the contents therein, and, particularly, the folding of the pocket and the body flaps in proper sequence after its contents have been placed in the sealing pocket, to secure the double inclosure of such contents in the members of the envelop.

To give a better understanding of the construction and use of the envelop, I will describe the operation of placing a number of currency notes therein.

When a shipment is to be made, the sender places the envelop blank on a desk, or the like, and before either of the body flaps is folded on to the back of the envelop he places the ends of the currency notes in the pocket so that one end of the pile 15 lies on the pocket and the rest of the pile lies exposed along the body portion of the envelop, a remittance slip 16 being preferably placed on the bottom of the pile and extended therebeyond so that the slip may be sewed to the envelop and a record thereon exposed to view when the pocket is removed from the body of the envelop. When the pile of currency is so placed, the pocket is folded at the line of division between the envelop body and pocket, so that the pocket member is brought over the body of the envelop and lies thereon with the flaps facing inwardly and the currency notes overlapped and inclosed between the pocket and body portions (Fig. III). When the pocket has been so placed, the body flaps 5 and 7 are folded onto the back of the envelop so that they overlap and inclose the pile of currency and the pocket member (Fig. IV). The sender then passes a thread or cable through the body flaps 5, the pocket portion of the envelop back 4, one thickness of the pile of currency, the inclosing flaps 6, and the flap 8, when the latter is of sufficient length, the other thickness of the pile of currency, and out through the body portion of the envelop back 4, brings the ends of the thread or cable 10 over the flaps 8 of the body part of the envelop, and applies a seal 11, so that it not only seals the cable to the envelop but seals the flaps 8, so that it would be impossible to open the envelop and reach the currency without breaking the seal and cutting the cable.

While the construction described constitutes an improvement in this class of envelops, I have provided an improved means for severing the envelop transversely, so that the contents may be exposed and inspected without breaking the seal 11 or the cable 10. This improvement consists of providing a line of easy severance transversely of the completed envelop at a point adjacent the end of the pocket 3 when the envelop is closed. This line of severance preferably consists of a row of perforations 12 that extends throughout the width of the envelop blank including the back 4 and side flaps 5, and which is arranged in such position that when the pocket 3 is folded onto the body part of the envelop the line of severance will be closely adjacent the closed end of the pocket, as illustrated in the several figures of the drawing. With this construction, when the envelop is sealed, a person receiving the envelop may tear the same along the line of severance and thereby expose the contents, so that if the envelop contains currency, notes, checks, securities, or the like, the same may be counted and inspected before the cable 10 is severed or the seal 11 broken. Should the recipient find that the envelop does not contain the proper number of notes, or the like, or should there be any discrepancy whatever in the contents he may then without breaking the seal return the pocket with the identical contents to the sender for correction.

As a convenient means for severing the pocket from the body of the envelop without danger of tearing the contents I provide a cable 13 that extends along the line of severance, and is of such length that its ends project over the edges of the flaps, so that when the envelop is folded and assembled, as described, one end of the cable will project beyond the edge of the outer envelop flap, so that when the pocket is to be removed a person may grasp the projecting end of the cable and by pulling thereon sever the envelop along the perforated line; it being apparent that with the cable glued, or otherwise secured to the inner face of the envelop, the cable may be unwound around the envelop to completely sever the pocket from the body of the envelop.

Having thus described my invention, what I claim as new therein, and desire to secure by Letters-Patent, is:—

1. An envelop comprising individual body and pocket members having a common back, end flaps foldable onto the back from opposite edges thereof, side flaps foldable onto the pocket portion of said back to form a pocket; the said pocket being foldable onto the body portion of the back, side flaps foldable onto the body portion of said back; the said back and body flaps having a permanent line of severance, whereby the pocket and part of the body member may be separated from the remainder of the body member.

2. An envelop comprising body and pocket members having a common back, end flaps foldable onto the back from opposite edges thereof, side flaps foldable onto the pocket portion of said back to form a pocket, said pocket being foldable onto the body portion of the back; side flaps foldable onto the body portion of said back, the said back and body flaps having a continuous line of perforation extending transversely thereacross whereby the pocket and part of the body member may be separated from the remainder of the body member.

3. A money transmitting envelop consisting of an oblong sheet of suitable fabric having a portion thereof separately provided with oppositely disposed overlapping side flaps and with an end flap adapted to overlap the outer ends of said side flaps and thereby forming an envelop, the remaining portion of the sheet being separately provided with oppositely disposed overlapping and united side flaps and with an end flap which overlaps the outer ends of said overlapping side flaps and is united therewith, said side flaps forming the side and said end flap the bottom of a pocket adapted to fold forwardly at its open end and lie within said envelop portion, said envelop portion having a crosswise extending line of perforations traversing the body and said side flaps, and a cable secured on the inner sides of the envelop portion and extending along said perforations and adapted for totally separating the envelop at said perforations.

In testimony whereof, I affix my signature.

WILLIAM P. FAULKNER.

Copies of this patent may be obtained for five cents each, by addressing the "Commissioner of Patents. Washington, D. C."